United States Patent
Makino (10) Patent No.: US 7,236,280 B2
(45) Date of Patent: Jun. 26, 2007

(54) MULTI-BEAM SCANNING DEVICE AND IMAGE FORMING APPARATUS USING THE SCANNING DEVICE

(75) Inventor: Hideyo Makino, Hachioji (JP)

(73) Assignee: Ricoh Company Limited, Tokyo (JP)

( * ) Notice: Subject to any disclaimer, the term of this patent is extended or adjusted under 35 U.S.C. 154(b) by 644 days.

(21) Appl. No.: 10/756,355

(22) Filed: Jan. 14, 2004

(65) Prior Publication Data

US 2004/0145644 A1 Jul. 29, 2004

(30) Foreign Application Priority Data

Jan. 20, 2003 (JP) .............................. 2003-011420

(51) Int. Cl.
*G02B 26/08* (2006.01)
*B41J 27/00* (2006.01)

(52) U.S. Cl. ...................... 359/204; 359/212; 347/243; 347/245

(58) Field of Classification Search ...................... None
See application file for complete search history.

(56) References Cited

U.S. PATENT DOCUMENTS

| | | | |
|---|---|---|---|
| 4,875,057 A | 10/1989 | Hediger et al. | |
| 5,786,594 A | 7/1998 | Ito et al. | |
| 5,926,203 A | 7/1999 | Shimura et al. | |
| 6,313,935 B1 | 11/2001 | Makino | |
| 6,320,647 B1 | 11/2001 | Makino | |
| 2002/0001118 A1* | 1/2002 | Nakajima et al. | ........... 359/204 |

FOREIGN PATENT DOCUMENTS

| | | |
|---|---|---|
| EP | 0 446 608 | 9/1991 |
| JP | 2001-13432 | 1/2001 |

OTHER PUBLICATIONS

U.S. Appl. No. 09/725,756, filed Nov. 30, 2000, Makino.
U.S. Appl. No. 09/820,933, filed Mar. 30, 2001, Makino.
U.S. Appl. No. 10/756,355, filed Jan. 14, 2004, Makino.

* cited by examiner

*Primary Examiner*—James Phan
(74) *Attorney, Agent, or Firm*—Oblon, Spivak, McClelland, Maier & Neustadt, P.C.

(57) ABSTRACT

A multi-beam scanning device including a multi-beam light source including plural laser diode arrays emitting plural laser beams and at least one coupling lens; a deflector configured to deflect the plural laser beams; an optical system configured to guide the deflected plural laser beams to an image forming surface; a body configured to contain the multi-beam light source, deflector and scanning optical system; and an adjustment member located between the body and the multi-beam light source and configured to adjust the beam pitch of the plural laser beams in the sub-scanning direction. An image forming apparatus including an image bearing member, the above-mentioned scanning device and an image forming device.

16 Claims, 9 Drawing Sheets

FIG. 8A (1200dpi : MAIN SCANNING DIRECTION : 256dots/pitch
SUB-SCANNING DIRECTION : 32lines/pitch)

FIG. 8B

FIG. 8C (1200dpi : MAIN SCANNING DIRECTION : 256dots/pitch
SUB-SCANNING DIRECTION : 32lines/pitch)

FIG. 8D

MULTI-BEAM SCANNING DEVICE AND IMAGE FORMING APPARATUS USING THE SCANNING DEVICE

BACKGROUND OF THE INVENTION

1. Field of the Invention

The present invention relates to a multi-beam scanning device, which performs optical image recording using plural light beams and which is for use in image forming apparatus such as laser printers, digital copiers, facsimile machines, etc. In addition, the present invention relates to an image forming apparatus using the multi-beam scanning device.

2. Discussion of the Background

In recent years, a need exists for image forming apparatus such as laser printers, facsimile devices and digital copiers, which can perform high speed and high density recording. In this case, if high speed recording is performed using a single beam scanning device, it is necessary to use a deflector which can rotate at a high speed. Such a deflector is expensive and in addition causes wind noises due to the high speed rotation. Therefore, it is necessary to provide a soundproof device, resulting in further increase of costs. In order to solve such a problem, a multi-beam scanning device which irradiates an image bearing member such as photoreceptors with plural laser beams at the same time has been used. By using such a multi-beam scanning device, high speed and high density recording can be performed without rotating a deflector at a high speed.

It is necessary for such a multi-beam scanning device to scan plural laser beams at a desired beam pitch (i.e., interval between two adjacent scanning lines) in view of image quality. In particular, recently a need for high density images increases more and more to produce high quality images such that the scanning line density is 1200 dpi (dot per inch).

In order to perform high density recording, a method in which plural light sources and plural coupling lens are rotated around an axis which is perpendicular to the main scanning direction and sub-scanning direction is known. Published unexamined Japanese Patent Application No. 2001-13432 discloses a technique such that only plural light sources and plural coupling lens are rotated while the aperture configured to perform beam regulation is not rotated around the rotation axis. By using this technique, change of beam pitch caused by changing and adjusting operations of the beam pitch can be prevented and thereby a desired beam pitch can be obtained.

In such a method, the beam pitch adjusting operation has to be performed while the scanning device is attached to a housing of the optical unit. However, the positions of the light sources relative to the coupling lens have been adjusted. If one or more light sources are damaged and thereby image qualities seriously deteriorate, there are two methods for repairing the scanning device. One of the methods is to exchange the unit holder including the light sources and the coupling lens, followed by adjustment of the beam pitch. The other of the methods is to exchange the multi-beam scanning device itself, inclusive of the housing, which device has been subjected to beam pitch adjustment. It takes a long time to perform such an exchanging operation and beam adjustment operation. In addition, when performing such operations, it is necessary to remove parts and units associated to the scanning device. Therefore, service engineers typically dislike such operations. In view of such circumstances, a need exists for a multi-beam scanning device which service engineers can easily exchange and which can be used soon after being set to an image forming apparatus without performing an adjustment operation. In addition, there is a need to visually confirm whether the beam pitch of the exchanged scanning device is proper.

SUMMARY OF THE INVENTION

Accordingly, an object of the present invention is to provide a multi-beam scanning device which can perform high speed and high density recording while the beam pitch thereof need not be adjusted when the scanning device is set in an image forming apparatus.

Another object of the present invention is to provide a multi-beam scanning device which can be set without performing an adjustment operation while it is visually confirmed whether the beam pitch of the set scanning device is proper.

Yet another object of the present invention is to provide an image forming apparatus which can perform high speed and high density recording while the scanning device thereof can be easily exchanged without performing an adjustment operation in case of failure of the scanning device.

Briefly these objects and other objects of the present invention as hereinafter will become more readily apparent can be attained by a multi-beam scanning device which includes:

a multi-beam light source including:
plural laser diode arrays each of which is configured to emit plural laser beams; and
at least one coupling lens configured to couple the plural laser beams, wherein the positions of the coupling lens and the plural laser diodes are adjusted so as to be in predetermined positions relative to the other;
a deflector configured to deflect the plural laser beams;
an optical system configured to guide the deflected plural laser beams to an image forming surface such that the plural laser beams emitted from the plural laser diodes scan the image forming surface in a main scanning direction, wherein the scanning of the plural laser beams is performed in parallel with the others at beam pitches in the sub-scanning direction;
a body configured to contain the multi-beam light source, the deflector and the scanning optical system, wherein the multi-beam light source, the deflector and the scanning optical system are adjusted so as to be in predetermined positions relative to the others; and
an adjustment member located between the body and the multi-beam light source and configured to adjust the beam pitches so as to be a predetermined beam pitch in the sub-scanning direction.

It is preferable that the plural laser beams emitted by one of the plural laser diodes and coupled by the coupling lens, and the plural laser beams emitted by adjacent one of the plural laser diodes coupled by the coupling lens form a predetermined beam angle $\theta$ ($\theta > 0°$).

In addition, the adjustment member preferably includes one or more sheet materials having different thickness, and wherein thickness of the adjustment member is changed to adjust the beam pitches. The sheet materials having different thickness preferably have different colors or forms so as to be visually distinguished from the others.

The sheet materials are preferably plastic films or metal plates. In addition, it is preferable that an adhesive is coated on a surface of the adjustment member.

As another aspect of the present invention, an image forming apparatus is provided which includes:
an image bearing member configured to bear a latent image thereon;

the multi-beam scanning device configured to irradiate the image bearing member with the plural laser beams to form the latent image on the image bearing member; and an image forming device configured to visualize the latent image.

It is preferable that the image forming device visualizes the latent image with a toner to form a toner image, and wherein the image forming apparatus further includes a fixing device configured to fix the toner image on a receiving material.

In addition, it is preferable that the image forming apparatus further includes a controlling device configured to control the multi-beam scanning device, the image forming device and the fixing device so as to output an image by which whether the beam pitches are the predetermined beam pitch can be visually determined.

The controlling device preferably controls the multi-beam scanning device such that the image is formed by scanning any two laser beams of the plural laser beams at a predetermined length in the main scanning direction. The two laser beams are preferably adjacent to the other on the image forming surface.

It is preferable that the controlling device controls the multi-beam scanning device such that the image is formed by scanning a pair of adjacent laser beams at a predetermined length in the main scanning direction to form first two line images, followed by scanning another pair of adjacent laser beams to form second two line images, and wherein the second two line images start from a predetermined position in the main scanning direction and are apart from the first two line images by one beam pitch in the sub-scanning direction.

Further it is preferable that the image includes a first pattern image and a second pattern image, wherein the first pattern image is formed by scanning at least two laser beams of the plural laser beams while the at least two laser beams are deflected at the same surface of the deflector, and wherein the second pattern image is formed by scanning at least two laser beams of the plural laser beams while the at least two laser beams are deflected at two adjacent surfaces of the deflector.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

The present invention will be explained in detail referring to drawings.

Figure 6:
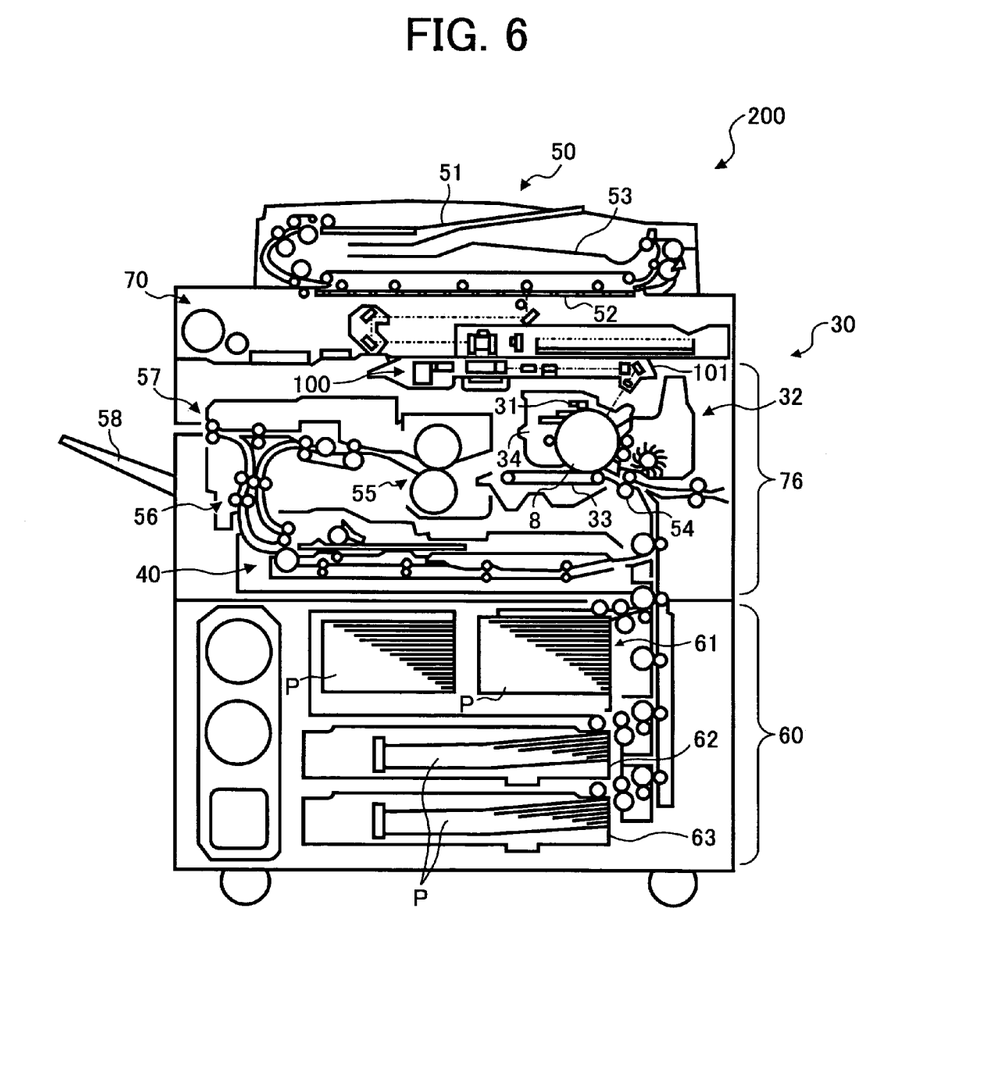
FIG. 6 is a schematic view illustrating a copier which is an embodiment of the image forming apparatus of the present invention.

FIG. 6 is a schematic view illustrating an embodiment (i.e., a digital copier) of the image forming apparatus of the present invention, in which the multi-beam scanning device is installed.

A digital copier 200 includes a main body 30, an automatic document feeder 50 (hereinafter referred to as an ADF 50) and a paper feeding unit 60. The ADF 50 automatically feeds the original documents set on an original tray 51 one by one to set each of original documents on a contact glass 52 in the main body 30. After the image information of the original document set on the contact glass 52 is read by a scanner 70, the original document is discharged to an original discharge tray 53. The main body 30 of the copier 200 includes the scanner 70 which reads the image information of the original document set on the contact glass 52; a multi-beam scanning device 101 having a multi-beam light source 100; an image forming device 76 which includes a photosensitive drum 8 serving as a latent image bearing member; etc. The scanner 70 includes an optical scanning device having a lamp, plural mirrors, plural lens, a charge coupled device (i.e., a CCD), etc.

Around the photosensitive drum 8 of the image forming device 76, a charger 31, a developing device 32, a transfer belt 33 which forms an image transfer portion, a cleaner 34, etc. are arranged. In addition, a fixing device 55 is arranged at a location downstream from the photosensitive drum 8 relative to the paper feeding direction. Namely, in FIG. 6, the fixing device 55 is located at a left side of the photosensitive drum 8. Further, a reversing/discharging device 56 is arranged at a location downstream from the fixing device 55. Furthermore, the main body 30 includes a double-side copying unit 40 which is located below the fixing device 55 and is configured to reverse a receiving paper with a toner image on one side thereof and feed the paper to the photosensitive drum 8 in order to produce a double-sided copy.

The optical scanning device of the scanner 70 optically scans the image of the original document set on the contact glass 52, and the read image information is focused on the photo-receiving surface of the CCD by the lens so as to be subjected to photoelectric conversion. Then the image signal (i.e., the image information) is subjected to treatments such as A/D conversion, followed by various image treatments performed by an image processor 74 (illustrated in FIG. 7).

The multi-beam scanning device 101 irradiates the photosensitive drum 8 with laser beams according to the image signal to form an image on the photosensitive drum 8, the surface of which has been charged with the charger 31. Thus, an electrostatic latent image is formed on the surface of the photosensitive drum 8. When the photosensitive drum 8 is rotated clockwise in FIG. 6 and the latent image reaches such a position as to face the developing device 32, the latent image is developed by the developing device 32, resulting in formation of a toner image (i.e., a visual image).

On the other hand, from one of a tandem type mass paper feeding device 61 provided on the paper feeding unit 60, and universal trays 62 and 63, a receiving paper P is fed to the main body 30 of the copier 200. When the tip of the receiving paper P strikes a pair of registration rollers 54, the receiving paper P is stopped. Then the receiving paper P is timely fed by the pair of registration rollers 54 so that the toner image formed on the photosensitive drum 8 is transferred onto a proper position of the receiving paper P.

The receiving paper P having the toner image thereon is separated from the photosensitive drum 8, and fed to the fixing device 55 at which the toner image is fixed by a fixing roller on the receiving paper P. The receiving paper P with a fixed toner image thereon is fed straight by the reversing/discharging device 56 if no image is to be formed on the backside of the receiving paper P. Then the receiving paper P with the fixed toner image is discharged by a pair of discharging rollers 57 to a discharge tray 58.

When an image is formed on the backside of the receiving paper P, the receiving paper P, on one side of which the toner image is formed, is fed to the double-side copying unit 40 to be reversed. The reversed receiving paper P is fed again to the photosensitive drum 8 of the image forming device 76 so that a toner image is formed on the backside of the receiving paper P. After the toner image is fixed by the fixing device 55, the receiving paper P having toner images on both sides thereof is fed straight by the reversing/discharging device 56 and discharged on the discharge tray 58 by the pair of discharging rollers 57.

In this example, the photosensitive drum 8 serving as an image bearing member includes a photoconductive material. However, the image bearing member is not limited thereto, and a silver halide film can also be used. When a silver halide film is used as the image bearing member, a visual image can be formed by irradiating the film with laser beams emitted by the multi-beam scanning device 101 to form a latent image therein and developing the latent image with a conventional silver halide developing method. This type of image forming apparatus can be used as an optical plate making machine. In addition, a sheet-form photosensitive medium such as zinc oxide paper can also be used. In this case, a toner image is formed on the photosensitive medium is fixed thereon, namely, the photosensitive medium serves as the latent image bearing member and the receiving paper P.

In the example mentioned above, the toner image prepared by developing a latent image on the image bearing member is transferred onto a receiving material (such as papers and overhead projection sheets). However, the following image forming method can also be used. Namely, an electrostatic latent image formed on the image bearing member is transferred onto a recording medium. The electrostatic latent image transferred on the recording medium is developed with a toner to form a toner image on the recording medium and the toner image is transferred on a receiving material.

Further, in the example mentioned above, the toner image formed on the image bearing member is directly transferred onto the receiving paper P, however, an image transfer method in which the toner image is transferred on an intermediate transfer medium and then the toner image is transferred onto the receiving paper P can also be used.

Then the multi-beam scanning device 101 will be explained referring to FIG. 1.

Figure 1:
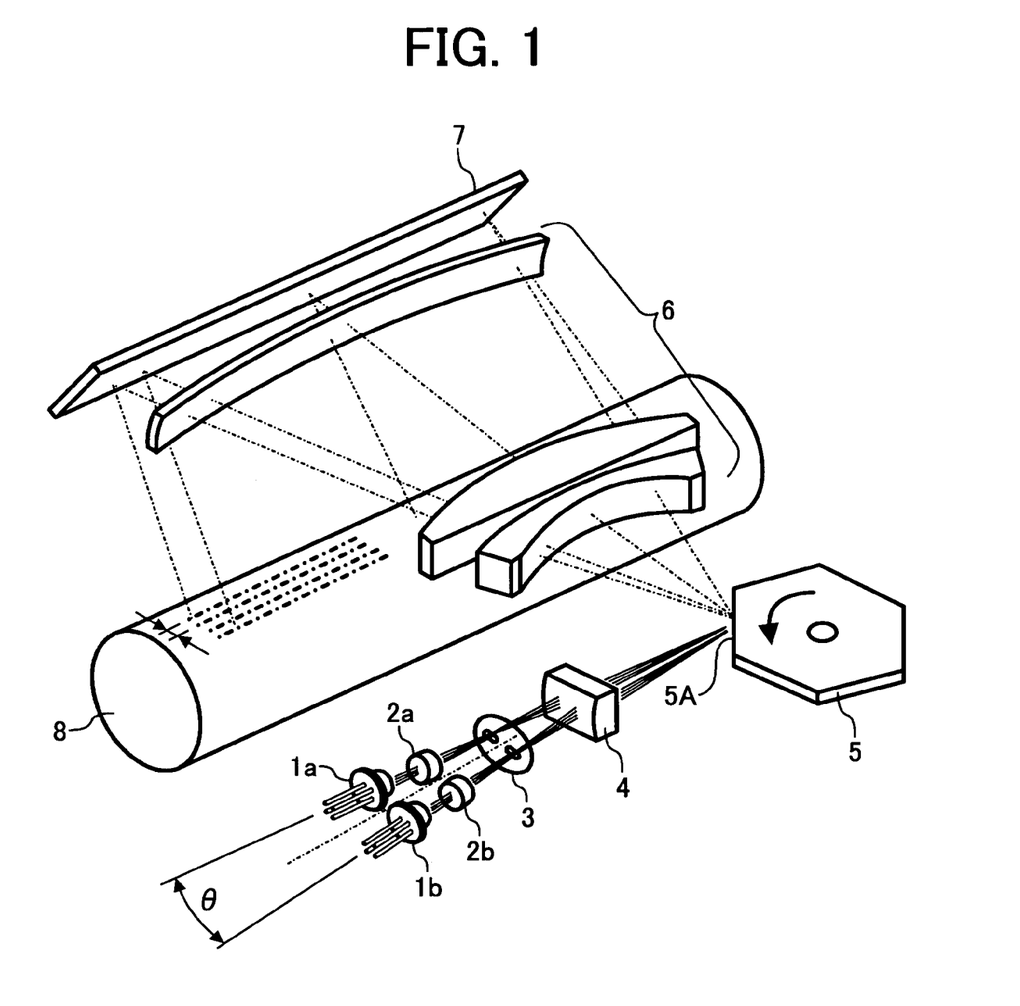
FIG. 1 is a perspective view illustrating an embodiment of the multi-beam scanning device of the present invention and a photosensitive drum serving as an image bearing member.

FIG. 1 is a perspective view illustrating an embodiment of the multi-beam scanning device of the present invention and a photosensitive drum serving as an image bearing member. In this embodiment of the multi-beam scanning device, scanning is performed using 8 beams. The light source includes two laser diode arrays 1*a* and 1*b*, each of which has four light emitting points. The multi-beam scanning device 101 includes the laser diode arrays 1*a* and 1*b*; coupling lens 2*a* and 2*b*, each of which couples the respective four light beams; an aperture 3 in which openings are formed to form beam spots having a desired spot form; a cylindrical lens 4 which focuses the laser beams in the sub-scanning direction; a deflector 5 (i.e., a polygon mirror) having a periphery on which plural deflective reflection surface 5A are provided; an optical lens system 6 including fθ lens, etc.; a mirror 7; etc.

The coupling lens 2*a* and 2*b* couple divergent laser beams emitted by plural light sources, so that the laser beams have a beam form (e.g., collimated beams, weakly divergent beams and weakly focused beams) suitable for the optical systems located after the coupling lens 2*a* and 2*b*. In this case, one coupling lens couples laser beams emitted by a corresponding light source. However, it is also possible that one coupling lens couples laser beams emitted by plural light sources.

As illustrated in FIG. 1, the laser beams emitted by the laser diode arrays 1*a* and 1*b* are coupled by the coupling lens 2*a* and 2*b* such that four laser beams emitted by four light sources of each of the laser diodes 1*a* and 1*b* are coupled by the respective coupling lens 2*a* and 2*b*. The thus coupled laser beams pass through the aperture 3 to be regulated, and are focused by the cylindrical lens 4 in the sub-scanning direction so that the laser beams form light line images, which extends in the direction corresponding to the main scanning direction, at a position near the deflective reflection surface 5A of the deflector 5. The light line images are reflected at the deflective reflection surface 5A. The thus formed plural light line images corresponding to the plural laser beams are separated with the others in the sub-scanning direction.

The light beams reflected at the deflective reflection surface 5A are deflected at the same angular speed as the deflector 5 rotates at a constant speed. The deflected light is focused on the photosensitive drum 8 by the optical lens system 6 via the mirror 7. Thus, light spots are scanned on the photosensitive drum 8 at a substantially constant speed while the light spots are separated from the others in the sub-scanning direction. In FIG. 1, the optical lens system 6 is constituted of lens such as fθ lens, but the optical system 6 can be constituted of a concave mirror or the like.

In addition, two laser diode arrays are used in this embodiment, but three or more pairs of a laser array and a coupling lens can be used to increase the number of laser beams.

The principal rays of the laser beams which have been coupled by the coupling lens 2*a* and 2*b* approach to the other in the main scanning direction as the laser beams approach the deflective reflection surface 5A, and cross the others in the direction corresponding to the main scanning direction at a position near the deflective reflection surface 5A. The angle formed by the laser beams which are emitted by the laser diode 1a and which have been coupled by the coupling lens 2a and the laser beams which are emitted by the laser diode 1b and which have been coupled by the coupling lens 2b is θ (θ>0°) as illustrated in FIG. 1 (hereinafter this angle is referred to as a beam angle). When the laser beams travelling toward the deflective reflection surface 5A have such a beam angle θ, it is not necessary to use an element which polarizes light to form a beam and which is conventionally used, such as polarizing beam splitter prisms.

Figure 3:
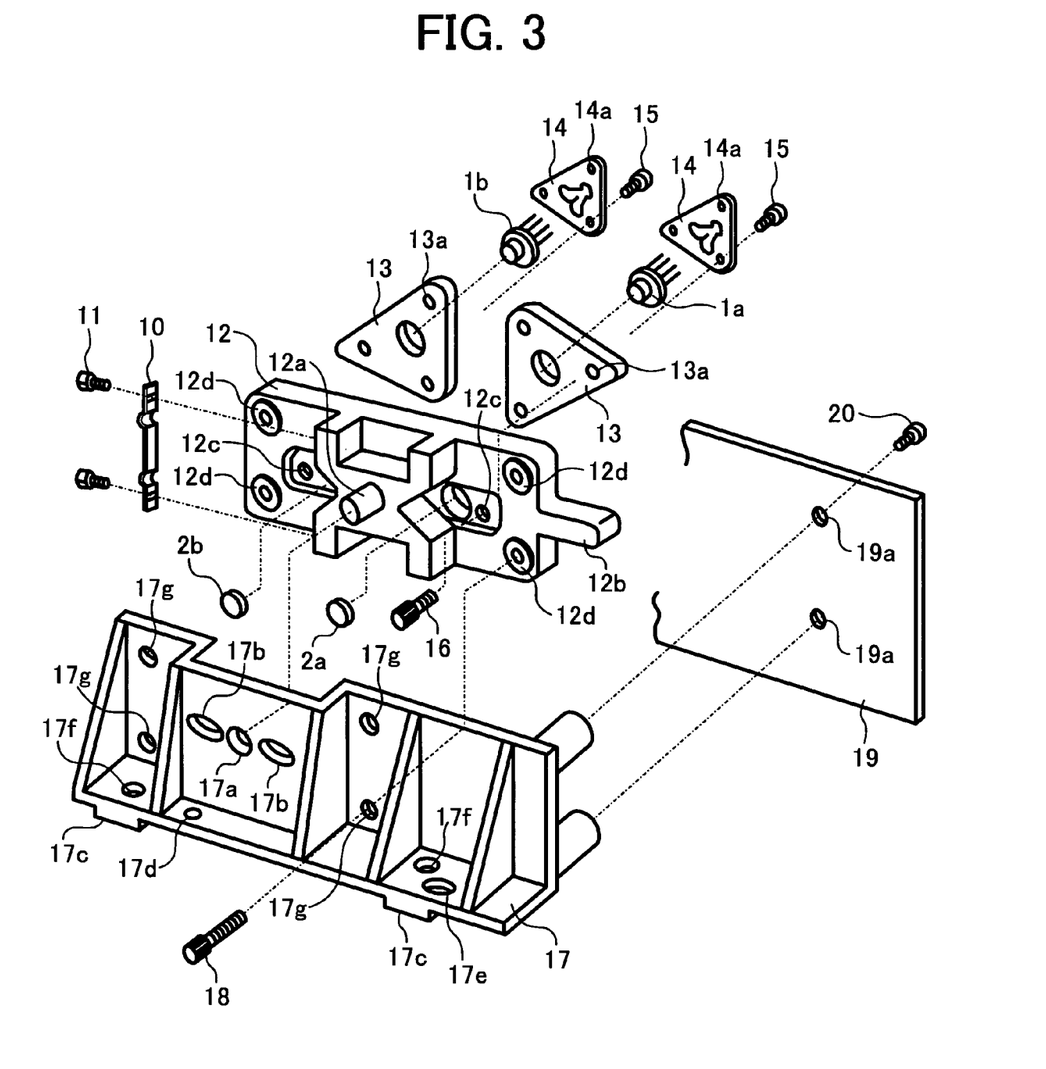
FIG. 3 is an exploded perspective view illustrating a multi-beam light source and adjacent members of the multi-beam scanning device of the present invention.
Figure 4:
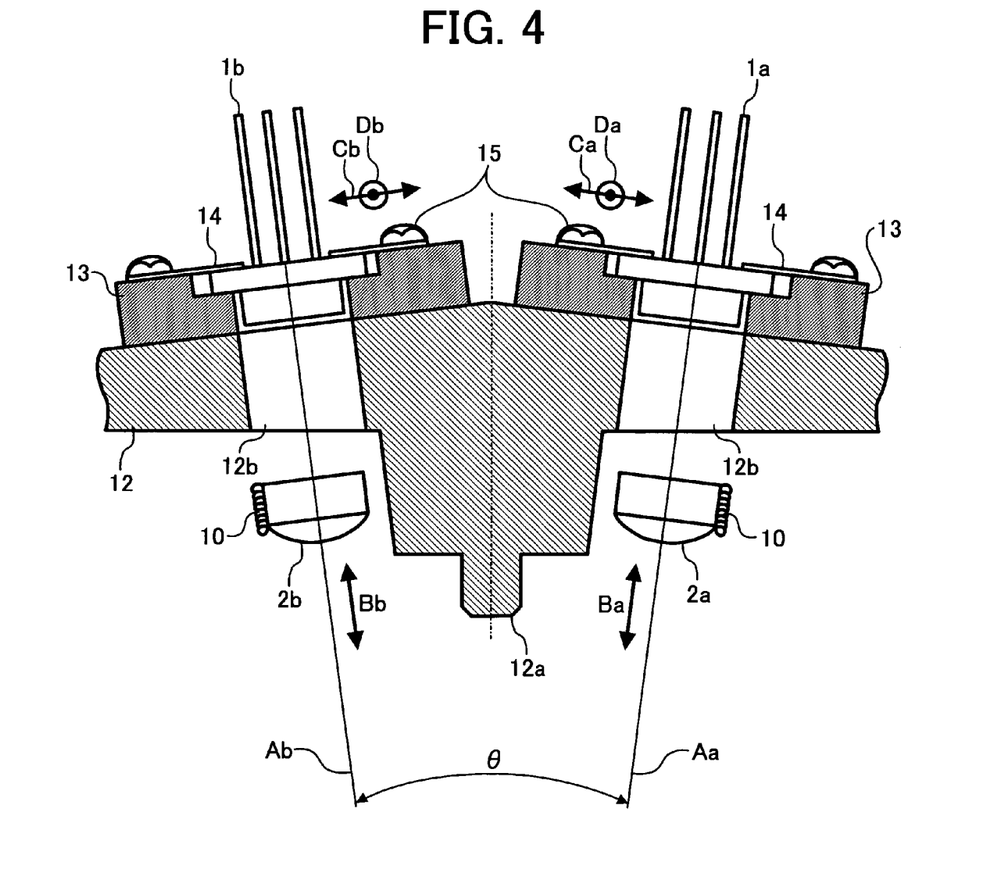
FIG. 4 is a cross sectional view illustrating the positional relationship between a multi-beam light source and coupling lens of the multi-beam scanning device of the present invention.

Then the structure of the multi-beam light source 100 and adjacent members will be explained referring to FIGS. 3 and 4. FIG. 3 is an exploded perspective view of the multi-beam light source 100 and adjacent members. FIG. 4 is a cross sectional view illustrating the positional relationship between the light source and the coupling lens.

The laser diodes 1a and 1b are fixed so as to be sandwiched by respective pressure members 14, which are located at the terminal sides of the laser diodes, and respective holders 13, which are located at the light-emitting sides thereof. The pressure members 14 and the holders 13 are fixed by three screws 15 which are engaged with three holes 14a formed on the pressure members 14 and three holes 13a formed on the holders 13. The holders 13 are fixed to a lens holder 12 with three screws 16.

The coupling lens 2a and 2b are fixed to the lens holder 12 while the side surfaces of the coupling lens 2a and 2b are pressed by respective blade springs 10, wherein the lower and upper ends of the blade springs 10 are fixed to the lens holder 12 by screws 11 (in FIG. 3, only one blade spring for the coupling lens 2b is illustrated).

FIG. 4 illustrates the positional relationship between the laser diodes 1a and 1b and the coupling lens 2a and 2b. In addition, FIG. 4 illustrates the cross section of the lens holder 12. In FIG. 4, the main scanning direction is the right-and-left direction of FIG. 4, and the sub-scanning direction is the direction perpendicular to the surface of the paper on which FIG. 4 is illustrated. Characters Aa and Ab represent optic axes of the light sources 1a and 1b. The positions of the coupling lens 2a and 2b can be adjusted while being moved in respective optic axis directions Ba and Bb. Thus, coupling adjustment (i.e., focusing adjustment) can be performed. After the coupling adjustment, the coupling lens 2a and 2b are fixed by the blade springs 10 and screws 11.

On the other hand, optic axis adjustment of the light sources is performed by moving the holder 13, on which the laser diode arrays 1a and 1b are fixed, on the lens holder 12 in directions Ca and Cb, and Da and Db, wherein the directions Ca and Cb correspond to the main scanning direction and the directions Da and Db correspond to the sub-scanning directions. After the optic axis adjustment, the holders 13 are fixed to the holder 12 with screws 16 which are inserted from holes 12c. Thus, the multi-beam light source 100 is assembled.

Then the beam pitch adjustment of the multi-beam light source will be explained.

Figure 2:
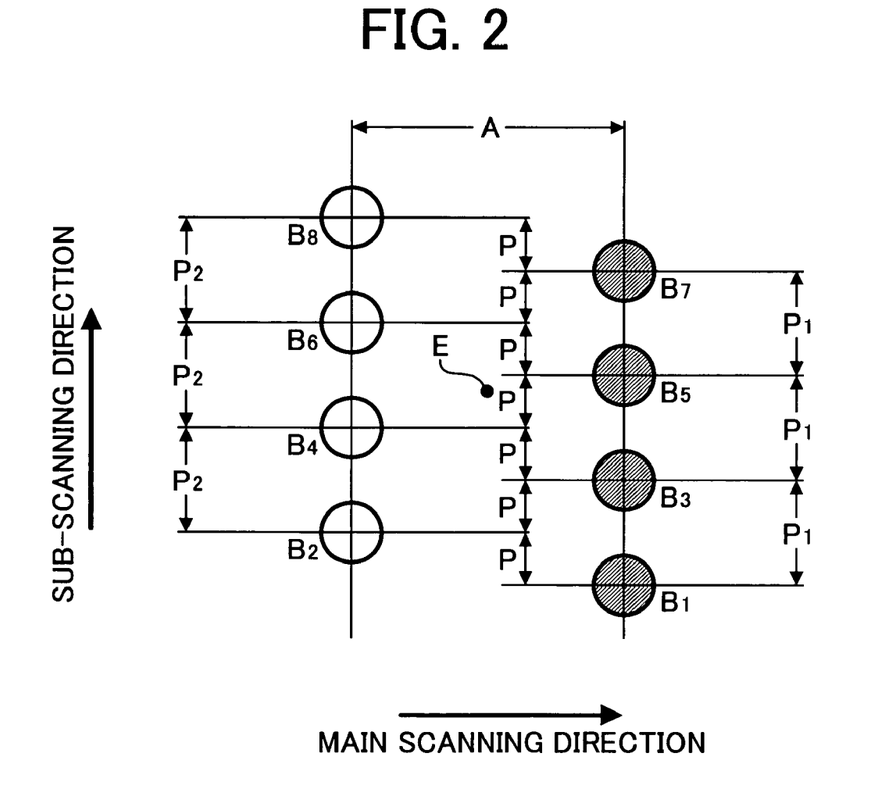
FIG. 2 is a schematic view illustrating eight light spots formed on a photosensitive drum by an embodiment of the multi-beam scanning device of the present invention.

At first, the arrangement of eight laser beams on the photosensitive drum 8 will be explained referring to FIG. 2. As illustrated in FIG. 2, the main scanning direction is the right-and-left direction in FIG. 2 (main scanning is performed from the left side to the right side), and the sub-scanning direction is the up-and-down direction in FIG. 2 (sub-scanning is performed from the bottom side to the top side).

In FIG. 2, light spots B1, B3, B5 and B7 are formed on the photosensitive drum by the laser beams emitted by one of the laser diode arrays, and light spots B2, B4, B6 and B8 are formed by the laser beams emitted by the other laser diode array. The eight light spots B1 to B8 are arranged in zigzags in the sub-scanning direction. In addition, the light spots B1, B3, B5 and B7 are arranged so as to be prior to the light spots B2, B4, B6 and B8 in the main scanning direction.

As illustrated in FIG. 2, the first light spot group (B1, B3, B5 and B7) are separated from the second light spot group (B2, B4, B6 and B8) by a distance A. This is because the laser diode arrays 1a and 1b are set so as to form the beam angle θ. The light spots B1, B3, B5 and B7 are accurately arranged in the sub-scanning direction so as to have an interval P1, which depends on the lateral magnification of the optical system. In addition, the light spots B2, B4, B6 and B8 are accurately arranged in the sub-scanning direction so as to have an interval P2, which also depends on the lateral magnification of the optical system. This is because the laser diodes 1a and 1b are accurately prepared by a semiconductor process. In this embodiment, the interval P1 is equal to the interval P2. Namely, dot images are recorded at a record interval P (i.e., P=P1/2 or P2/2). Specifically, in this embodiment, the intervals P1 and P2 are 42.3 μm, which correspond to 600 dpi in recording density, and the record interval P is 21.2 μm, which corresponds to 1200 dpi in recording density.

Then the method for adjusting the record interval P (hereinafter sometimes referred to as the beam pitch) of the multi-beam light source 100 will be explained referring to FIG. 3.

The subassembly, which has been subjected to the optical axis adjustment and the coupling adjustment, and a bracket 17 are rotatably set while a cylindrical projection 12a formed on the lens holder 12 is engaged with a hole 17a of the bracket 17. The laser beams passing through the coupling lens 2a and 2b pass through holes 17b of the bracket 17 and travel toward the aperture 3 (illustrated in FIG. 1). The lens holder 12 and the bracket 17 are fixed to the other by four screws 18 which are engaged with respective four holes 17g formed on the bracket 17 and respective four holes 12d formed on the lens holder 12, after the below-mentioned beam pitch adjustment.

The rotation center of the lens holder 12 and the bracket 17, which are illustrated in FIG. 3, corresponds to a point E illustrated in FIG. 2. When the lens holder 12 and the bracket 17 are rotated around the hole 17a, the eight light spots on the photosensitive drum 8 are rotated around the point E. By performing this rotation adjustment, the positional relationship between the first light spot group (B1, B3, B5 and B7) and the second light spot group (B2, B4, B6 and B8) can be changed. Thus, the beam pitch P can be adjusted.

The bracket 17 has two base levels 17c, which are bases when determining the position of the bracket 17 in the sub-scanning direction, and a positioning hole 17d and a long hole 17e, which are bases when determining the positions in the main scanning direction and the optical axis direction. These are bases when the multi-beam scanning device 101, specifically the multi-beam light source 100, is attached to a body 102 (illustrated in FIG. 5), or the devices are attached to an adjustment jig if the devices are adjusted in a factory before shipping.

The body 102 has and maintains a predetermined positional relationship with the deflector 5, the optical lens system 6 and the multi-beam light source 100. The body 102 is typically made of a metal such as aluminum die castings, a molding such as resin moldings, or a complex material such as complex material of a metal and a resin. When the beam pitch is adjusted in a factory, the following method is typically used. Namely, after the device is attached to an adjustment jig (not shown) while performing positioning, light spots are formed on a CCD camera, which is located at a position corresponding to the photosensitive drum 8, via a scanning optical system, which has the same constitution as that of the multi-beam scanning device 101 and a deflector, so that the beam pitch can be measured by the CCD camera.

At one end of the lens holder 12 of the multi-beam light source 100, an adjustment arm 12b is provided so as to project from the end face which is perpendicular to the longitudinal direction of the lens holder 12. The multi-beam light source 100 can be connected with an adjustment jig by the adjustment arm 12b and can be slightly moved in the sub-scanning direction. Since the adjustment arm 12b is located apart from the rotation center, the multi-beam light source 100 can be slightly rotated because of leverage due to the slight moving in the sub-scanning direction. When the desired beam pitch is obtained, the light source 100 and the bracket 17 are fixed to the other by the four screws 18. Then the assembly is fixed to a control circuit board 19 by screws 20 which pass through two holes 19a formed on the control circuit board 19. The laser diode arrays 1a and 1b are electrically connected with the control circuit board 19 with a material such as solder. Thus, the assembly of the multi-beam light source 100 is completed.

By performing the adjustment using an adjustment jig, not only the optical axis adjustment and coupling adjustment can be performed, but also the beam pitch can be adjusted so as to fall in a predetermined range. Namely, the resultant multi-beam light source 100 can serve as a unit, and can be used as service parts having good qualities.

However, when the multi-beam scanning device 101 is assembled in a factory, i.e., the optical systems, the deflector 5, etc. are set on the body 102 such a housing together with the multi-beam light source 100, the beam pitch often changes. This is because the base levels of the body 102, i.e., the base level thereof corresponding to the multi-beam light source 100 and the base level corresponding to the cylindrical lens 4, change depending on variation of the adjustment jigs and the processing accuracy of the body 102, etc. In addition, the cylindrical lens 4 is not the same as that used in the adjustment jig, and therefore there is a case where the optical axis is slanted against the base level of the lens itself, resulting in formation of undesired beam pitch. Since the multi-beam light sources are typically adjusted using the same adjustment jig, every light source has the same tendency with respect to the beam pitch. By improving the processing accuracy of the body 102 and the cylindrical lens, the variation of the beam pitch can be improved to some extent. However, yield of the light source deteriorates in the selection process of the light sources in that case, resulting in serious increase of manufacturing costs.

In the present invention, such a problem can be solved by the mechanism described below.

Figure 5:
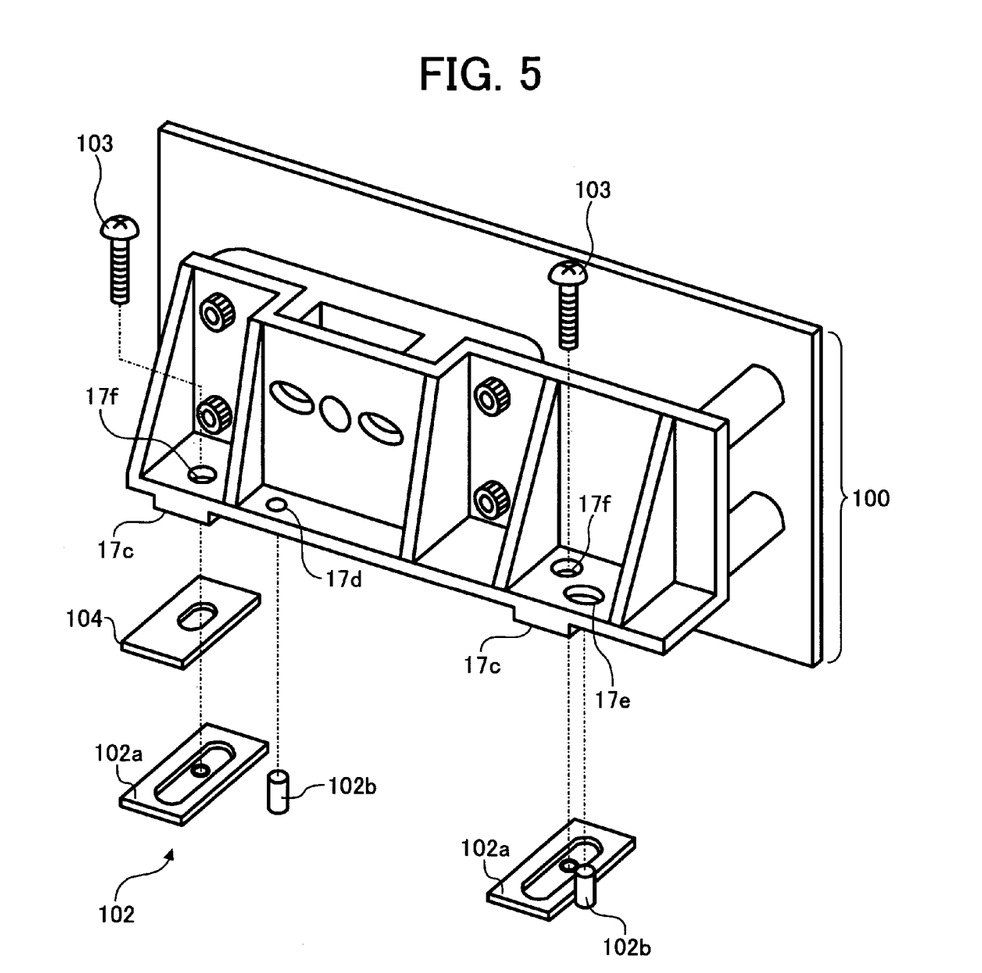
FIG. 5 is a perspective view illustrating the positional relationship between the multi-beam light source illustrated in FIG. 3 and a body in an embodiment of the image forming apparatus of the present invention.

FIG. 5 is a perspective view used for explaining how to position the multi-beam light source 100 relative to the body 102. The multi-beam light source 100 and the body 102 are properly positioned in the direction corresponding to the sub-scanning direction by properly positioning the two base levels 17c of the light source 100 and two base levels 102a of the body 102. In addition, the light source 100 and the body 102 are properly positioned in the directions corresponding to the main scanning direction and the optical axis direction by properly positioning hole 17d and the long hole 17e of the light source 100 and two pins 102b of the body 102. After the positioning operations, the light source 100 is fixed on the body 102 with two screws 103 which pass through holes 17f.

In this case, by inserting an adjustment member 104 between one of the two base levels 17c of the light source 100 and the corresponding base level 102a of the body 102, the multi-beam light source 100 is slanted at a small angle. Namely, the light spots can be rotated at a small angle. Thereby fine adjustment of the beam pitch can be performed. Thus, the beam pitch can be easily adjusted by inserting the adjustment member 104 between one of the two base levels 17c of the light source 100 and the corresponding base level 102a of the body 102. In addition, since the positions of the base levels in the direction corresponding to the main scanning direction are unchanged, the adjustment rate of the beam pitch is proportional to the thickness of the adjustment member 104.

Therefore, by measuring the beam pitch of the beams emitted by the multi-beam scanning device 101 at a position corresponding to the surface of the photosensitive drum 8 when the device 101 is assembled in a factory, it becomes clear how to adjust the beam pitch (i.e., the correction rate and correction direction of the beam pitch become clear) to properly set the multi-beam scanning device 101 in the image forming apparatus. By performing this beam pitch measurement and using several adjustment members having different thickness, the correction of the beam pitch can be precisely performed while saving labor.

In this embodiment, the adjustment member 104 has a thickness of 25 μm, 50 μm, 75 μm or 100 μm. Needless to say, these adjustment members can be used alone or in combination. As a result of the present inventor's experiment, it is confirmed that by using only one adjustment member having a thickness of 25 μm, the beam pitch can be changed by 1.5 μm, and by using a combination of adjustment members having a thickness of 200 μm in total, the beam pitch can be changed by 12 μm.

When several adjustment members are used, it is preferable that the members are visually different from the other so that the thickness thereof can be visually determined. Specifically, in this embodiment, the adjustment members of 25, 50, 75 and 100 μm thick are colored brown, transparent, black and milky white, respectively. Alternatively, a method in which the form of the adjustment members is changed, e.g., one or more corners are cut or one or more notches are formed, can also be used. The adjustment member 104 is preferably made of a plastic film (e.g., polyethylene terephthalate films) or a metal sheet. In view of costs, plastic films are preferable.

It is preferable that an adhesive is coated on a surface of the adjustment member 104 because the adjustment member 104 can be adhered to the body 102. By adhering the adjustment member 104 to the body 102, the attaching and detaching operations of the light source 100 can be easily performed without losing and moving the adjustment members.

By performing the beam pitch adjustment using the adjustment member, the position of the body 102 is adjusted relative to the multi-beam light source 100. Therefore, if the light source 100 is so damaged as to be changed with a new light source, the new light source can be set on the body 102 while the same adjustment member is used if the new light source is adjusted using the same adjustment jig as that used for the light source to be replaced. Thus, the exchanging operation can be easily performed in a short time without performing an adjustment operation.

The image forming apparatus of the present invention has a function to output images by which whether the beam pitch in the sub-scanning direction can be properly adjusted can be visually determined. By setting the image forming apparatus so as to adopt this mode, whether the beam pitch is proper can be visually determined.

Figure 7:
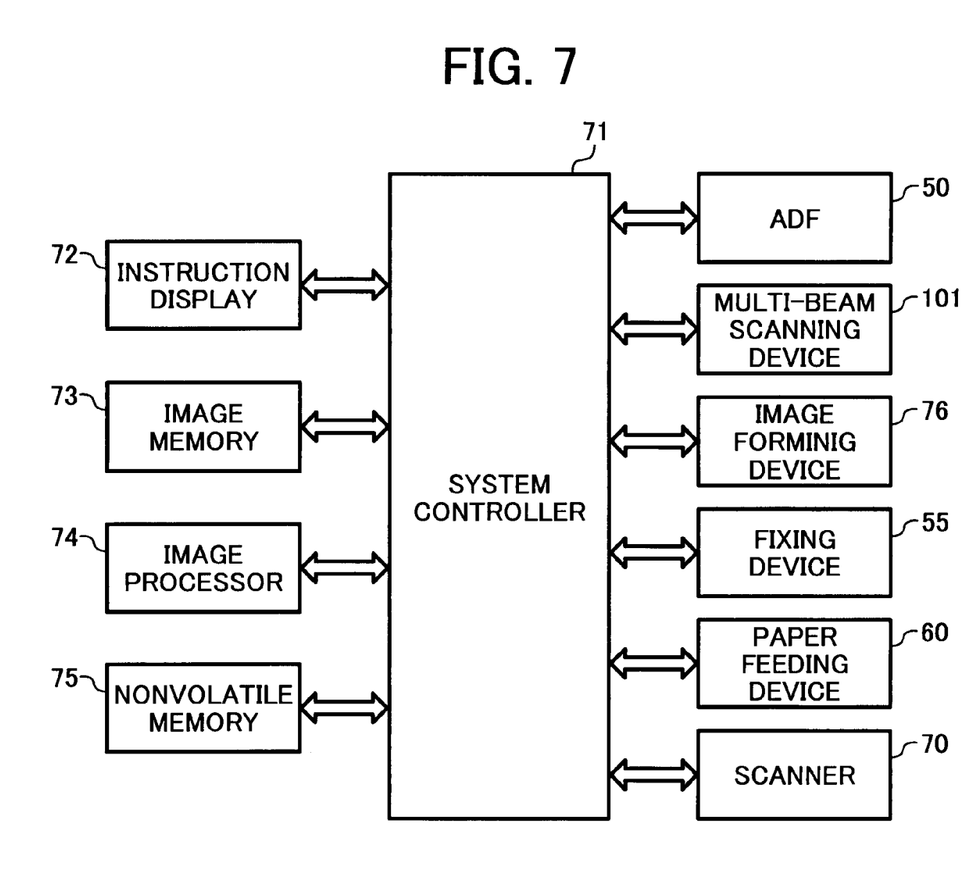
FIG. 7 is a block diagram illustrating a controlling circuit for use in the image forming apparatus of the present invention.

FIG. 7 is a block diagram illustrating the controlling circuit of an embodiment of the image forming apparatus of the present invention. In FIG. 7, a system controller 71 controls the ADF 50 (i.e., automatic document feeder), the multi-beam scanning device 101, the image forming device 76, the fixing device 55, the paper feeding unit 60 and the scanner 70. In addition, an instruction display 72, an image memory 73, an image processor 74 and a nonvolatile memory 75 are connected with the system controller 71.

When a user inputs an instruction using the instruction display 72, the system controller 71 performs controlling such that the user's desire is attained. Specifically, at first image data read by the scanner 70 are stored once in the image memory 73. Then image processing is performed in the image processor 74 so that the user's desire can be attained, followed by outputting the data to the multi-beam scanning device 101. An image is formed in the image forming device 76, and the image is transferred on the receiving paper P which has been fed by the paper feeding unit 60. The image on the receiving paper P is fixed by the fixing device 55 and the receiving paper p with a fixed image is discharged from the image forming apparatus by the discharging roller 57. This control program is stored in the nonvolatile memory 75, and the system controller 71 performs controlling according to the control program.

Figure 8A:
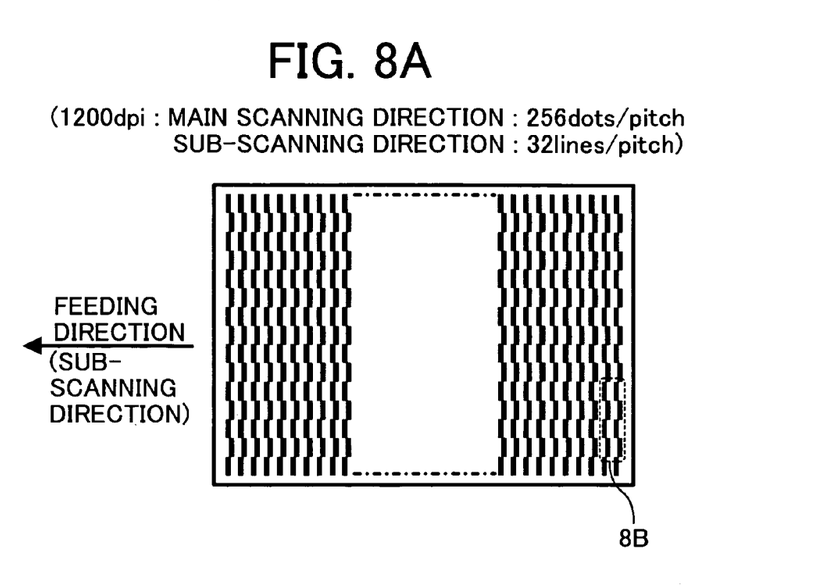
FIGS. 8A to 8D are embodiments of images by which whether the beam pitches of plural laser beams in the sub-scanning direction are proper can be visually determined.
Figure 8B:
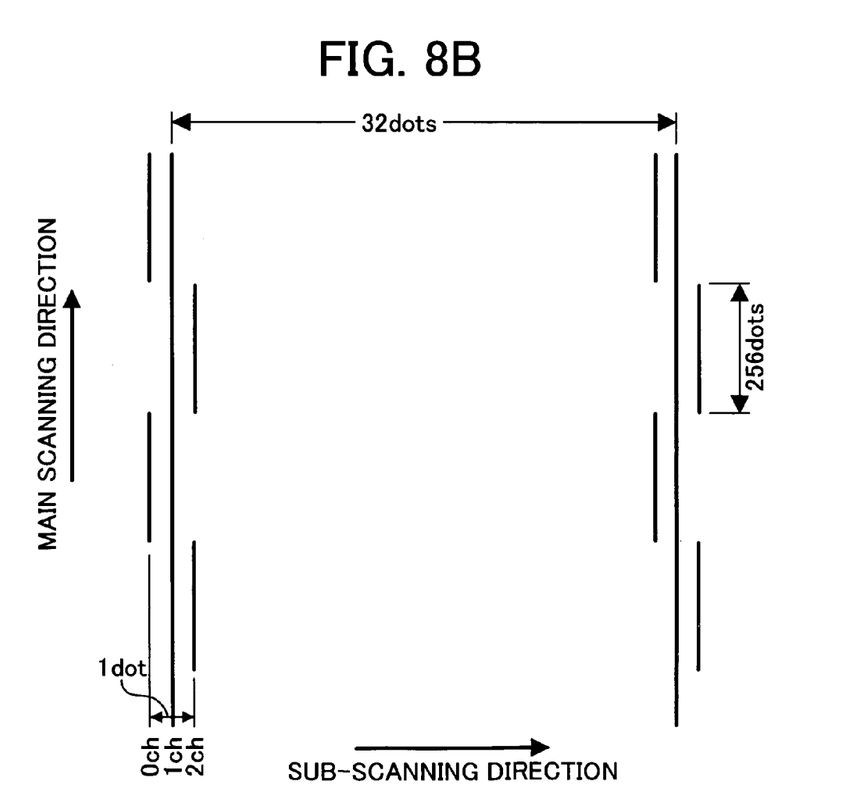
Figure 8C:
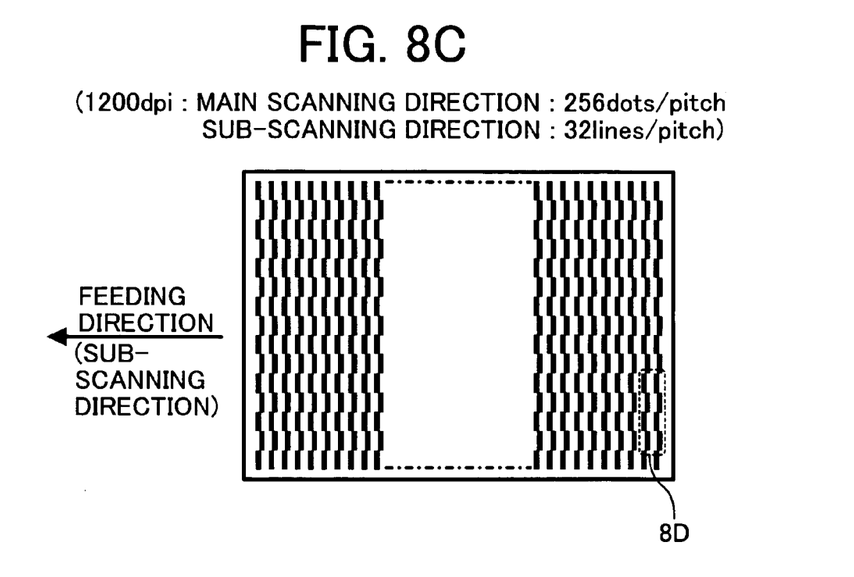
Figure 8D:
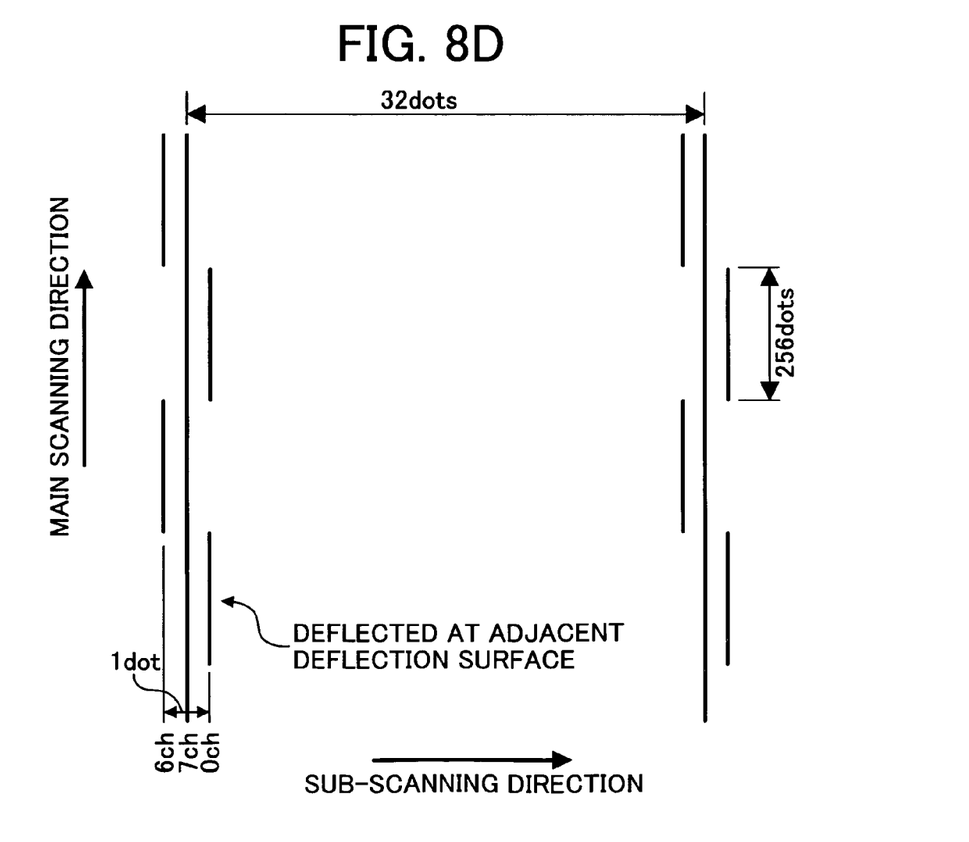

When the image forming apparatus has the mode as mentioned above in which the beam pitch can be visually observed (i.e., the user selects this mode using the instruction display), the images illustrated in FIGS. 8A and 8C are output. As illustrated in FIGS. 8A and 8C, the feeding direction of the receiving paper P (i.e., the sub-scanning direction) is the right-and-left direction in FIGS. 8A and 8C. FIGS. 8B and 8D are enlarged views of the images illustrated in FIGS. 8A and 8C, respectively.

The image illustrated in FIGS. 8A and 8B is formed using eight beams. The eight beams are represented as 0ch, 1ch, 2ch, 3ch, 4ch, 5ch, 6ch and 7ch, which correspond to the beams B1 to B8 in FIG. 2, respectively. The image illustrated in FIG. 8A is formed using the three beams of 0ch, 1ch and 2ch at a recording density of 1200 dpi (dots per inch). As illustrated in FIG. 8B, at first, line images each constituted of 256 dots are formed in the main scanning direction using a pair of the beams of 0ch and 1ch, and then line images each constituted of 256 dots are formed in the main scanning direction using a pair of the beams of 1ch and 2ch. These image operations are repeated in the main scanning direction. The thus prepared image block is repeatedly formed in the sub-scanning direction at an interval of 32 dots.

When observing the image illustrated in FIG. 8A with respect to the main scanning direction, two adjacent beams are always used for forming the image. If the beam pitch in the sub-scanning direction is uniform (i.e., the interval between the 0ch and the 1ch, or the 1ch and 2ch, is uniform), the resultant image is observed to have a uniform image density because the interval between the line image of 0ch and the line image of 1ch is the same as that between the line image of 1ch and the line image of 2ch. However, if the beam pitches are different, the intervals between the line images are different and thereby the images are observed to have uneven image density. Namely, it can be visually determined whether the beam spots are regularly formed at a beam interval p as illustrated in FIG. 2. In this embodiment, an image constituted of 256 dots in the main scanning direction is repeatedly formed at an interval of 32 dots in the sub-scanning direction, but the image is not limited thereto. It is preferable that the image can be changed depending on the recording density, and the constitution of the optical system and image forming apparatus to easily determine whether the beam pitch is uniform.

The image illustrated in FIG. 8C is the same as that illustrated in FIG. 8A except that the line images are formed using the beams of 6ch, 7ch and 0ch (i.e., B7, B8 and B1 in FIG. 2) instead of the beams of 0ch, 1ch and 2ch (i.e., B1, B2 and B3 in FIG. 2). Line images constituted of 256 dots are repeatedly formed using a pair of the beams of 6ch and 7ch and a pair of the beams of 7ch and 0ch. As can be understood from FIG. 2, the beam 0ch is the beam B1 which is located next to the beam B8 in the sub-scanning direction, and therefore the beam B1 is deflected by the surface of the deflector 5 (i.e., a polygon mirror), which surface is different from (i.e., the surface next to) the surface at which the beams 6ch and 7ch are deflected. Thus, the image block of the image illustrated in FIGS. 8C and 8D is formed using different deflection surfaces (i.e., two adjacent deflection surfaces) whereas the image block of the image illustrated in FIGS. 8A and 8B is formed using the same deflection surface.

Namely, the image illustrated in FIGS. 8B and 8D includes variation of deflection surfaces of the deflector 5 in angle and distance from the center of the deflector. Therefore, by recording this image, the overall characteristics of the multi-beam scanning device 101 can be visually checked.

By outputting these images, service engineers and persons in charge of beam pitch adjustment in factory can easily adjust the beam pitch.

It is preferable that this beam pitch checking mode is distinguished from the general modes used by users and is set in a special mode to be used by service engineers and persons in charge of beam pitch adjustment in factory. For example, it is possible to allow the image forming apparatus to have the beam pitch checking mode by inputting a special password from the instruction display. The beam pitch checking mode is set in the control program, and a CPU in the system controller 71 controls the multi-beam scanning device so as to record the images illustrated in FIGS. 8A and 8C.

The image forming apparatus of the present invention uses a beam scanning device in which a desired beam pitch can be easily obtained without performing complicated adjustment operations, and thereby high quality images can be produced at a high speed.

This document claims priority and contains subject matter related to Japanese Patent Application No. 2003-011420, filed on Jan. 20, 2003, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A multi-beam scanning device, comprising:
   a multi-beam light source, including
      plural laser diode arrays each of which is configured to emit plural laser beams, and
      at least one coupling lens configured to couple the plural laser beams, wherein the at least one coupling lens and the plural laser diode arrays are adjusted so as to be in predetermined positions relative to the other;
   a deflector configured to deflect the plural laser beams emitted by the plural laser diode arrays;

an optical system configured to guide the deflected plural laser beams to an image forming surface such that the plural laser beams emitted from the plural laser diode arrays scan the surface in a main scanning direction, wherein the scanning of the plural laser beams is performed in parallel with each other at beam pitches in the sub-scanning direction;

a body configured to contain the multi-beam light source, the deflector and the scanning optical system, wherein the multi-beam light source, the deflector and the scanning optical system are adjusted so as to be in predetermined positions relative to the others; and an adjustment member located between the body and the multi-beam light source and configured to adjust the beam pitches in the sub-scanning direction so as to be a predetermined beam pitch, wherein the adjustment member comprises one or more members selected from sheet materials having different thickness.

2. The multi-beam scanning device according to claim 1, wherein the plural laser beams emitted by one of the plural laser diode arrays and coupled by the at least one coupling lens, and the plural laser beams emitted by an adjacent one of the plural laser diode arrays coupled by the at least one coupling lens form a predetermined beam angle θ (θ>0°).

3. The multi-beam scanning device according to claim 1, wherein the sheet materials having different thickness have different colors so as to be visually distinguished from the others.

4. The multi-beam scanning device according to claim 1, wherein the sheet materials having different thickness have different forms so as to be visually distinguished from the others.

5. The multi-beam scanning device according to claim 1, wherein the sheet materials are plastic films.

6. The multi-beam scanning device according to claim 1, wherein the sheet materials are metal plates.

7. The multi-beam scanning device according to claim 1, wherein the adjustment member has an adhesive on a surface thereof.

8. An image forming apparatus comprising:
an image bearing member configured to bear a latent image thereon;
the multi-beam scanning device according to claim 1 configured to irradiate the image bearing member with the plural laser beams to form the latent image on the image bearing member; and
an image forming device configured to visualize the latent image.

9. The image forming apparatus according to claim 8, wherein the image forming device visualizes the latent image with a toner to form a toner image, and wherein the image forming apparatus further comprises:
a fixing device configured to fix the toner image on a receiving material.

10. The image forming apparatus according to claim 9, further comprising:
a controlling device configured to control the multi-beam scanning device, the image forming device and the fixing device so as to output an image by which whether the beam pitches are the predetermined beam pitch can be visually determined.

11. The image forming apparatus according to claim 10, wherein the controlling device controls the multi-beam scanning device such that the image is formed by scanning any two laser beams of the plural laser beams at a predetermined length in the main scanning direction.

12. The image forming apparatus according to claim 11, wherein the two laser beams are adjacent to the other on the image forming surface.

13. The image forming apparatus according to claim 10, wherein the controlling device controls the multi-beam scanning device such that the image is formed by scanning a pair of adjacent laser beams at a predetermined length in the main scanning direction to form first two line images, followed by scanning another pair of adjacent laser beams to form second two line images, and wherein the second two line images start from a predetermined position in the main scanning direction and are apart from the first two line images by one beam pitch in the sub-scanning direction.

14. The image forming apparatus according to claim 10, wherein the image is at least one of a first pattern image and a second pattern image, wherein the first pattern image is formed by scanning at least two laser beams of the plural laser beams while the at least two laser beams are deflected at a same surface of the deflector, and wherein the second pattern image is formed by scanning at least two laser beams of the plural laser beams while the at least two laser beams are deflected at two adjacent surfaces of the deflector.

15. The multi-beam scanning device according to claim 1, wherein the adjustment member is located between one of two base levels of the multi-beam light source and a corresponding base level of the body such that the multi-beam light source is slanted with respect to the body, and said base levels correspond to where the multi-beam light source is fixed to the body.

16. A multi-beam scanning device, comprising:
a multi-beam light source, including
plural laser diode arrays each of which is configured to emit plural laser beams, and
at least one coupling lens configured to couple the plural laser beams, wherein the at least one coupling lens and the plural laser diode arrays are adjusted so as to be in predetermined positions relative to the other;

a deflector configured to deflect the plural laser beams emitted by the plural laser diode arrays;

an optical system configured to guide the deflected plural laser beams to an image forming surface such that the plural laser beams emitted from the plural laser diode arrays scan the surface in a main scanning direction, wherein the scanning of the plural laser beams is performed in parallel with each other at beam pitches in the sub-scanning direction;

a body configured to contain the multi-beam light source, the deflector and the scanning optical system, wherein the multi-beam light source, the deflector and the scanning optical system are adjusted so as to be in predetermined positions relative to the others; and an adjustment member located between the body and the multi-beam light source and configured to adjust the beam pitches in the sub-scanning direction so as to be a predetermined beam pitch, wherein the adjustment member is located between one of two base levels of the multi-beam light source and a corresponding base level of the body such that the multi-beam light source is slanted with respect to the body, and said base levels correspond to where the multi-beam light source is fixed to the body.

* * * * *